United States Patent Office 3,205,343
Patented Sept. 7, 1965

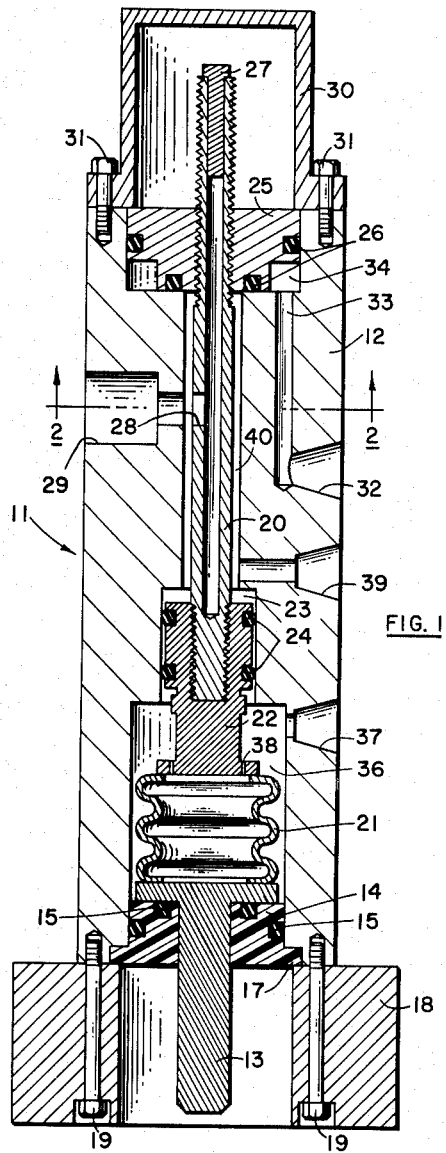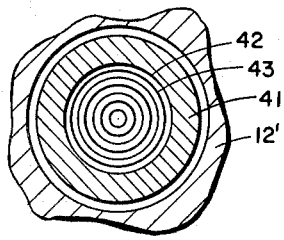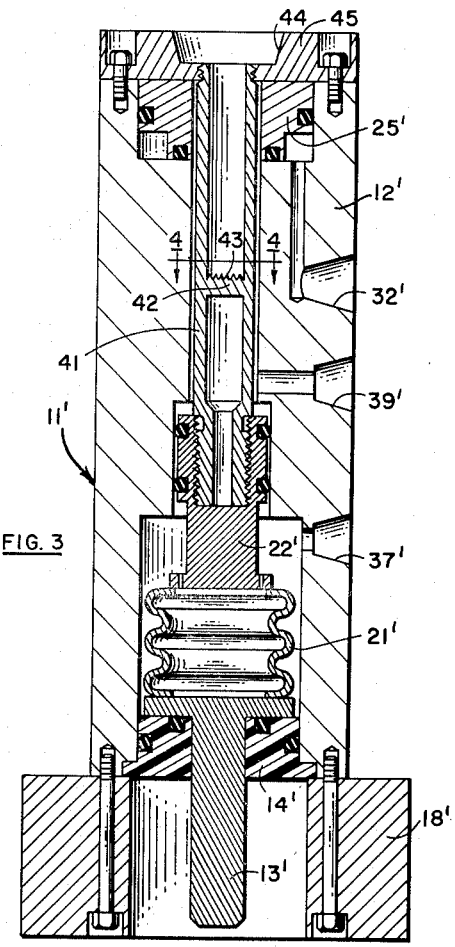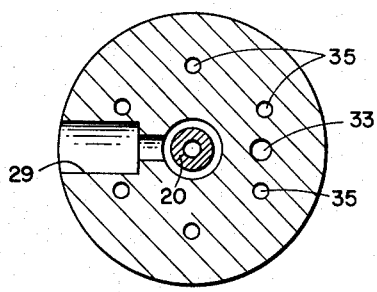
INVENTORS
ARTHUR G. DeBELL
QUINN S. ANDERSON
BY FREDERICK S. SIMMONS
ATTORNEY

3,205,343
BLACKBODY SOURCE
Arthur G. De Bell, Woodland Hills, and Quinn S. Anderson, Chatsworth, Calif., and Frederick S. Simmons, Ann Arbor, Mich., assignors to North American Aviation, Inc.
Filed Oct. 19, 1962, Ser. No. 232,666
9 Claims. (Cl. 219—553)

This invention relates to improved source of radiation. More particularly the invention pertains to a device for emission of blackbody radiation, i.e., sources of infrared, visible and ultraviolet energy, at exceedingly high temperatures.

Quantitative emission spectroscopy and radiometry of flames and other high temperature radiators require that spectroscopic or radiometric instruments be calibrated using a source of known intensity distribution. An example of such a high temperature source requiring that the radiometric and spectroscopic instruments be calibrated with a source of known intensity is rocket exhaust plumes. The ideal source for such purposes would be one producing blackbody radiation at temperatures spanning that of the unknown source.

Blackbody radiation is well-approximated by that emerging from a heated cavity, provided well known geometrical criteria are met. Numerous configurations and devices have been produced for the production of such blackbody radiation. As yet, however, no source is capable of continuous operation at temperatures up to and exceeding 2200° C.

The blackbody radiation source of this invention consists essentially of a tube which may be made of graphite situated within an outer housing. The tube member is heated directly with an alternating current. It is rigidly supported within the housing at the upper end thereof and an electrical connection is provided to the tube by means of a bushing situated thereat. At the opposite lower end electrical connection and linear motion to relieve thermal stress is effected by means of a piston and bellows arrangement. The tubular member seats within the piston which is in turn connected to the bellows at one end thereof. At the opposite end of the bellows is connected a terminal through which the electricity to the tube can be directed. The bellows and terminal are mounted on a bushing of insulating material so as to electrically insulate them from the housing. Each end of the tubular member making electrical connections is water cooled. Additionally, deterioration and oxidation of the tube, especially when it is made of graphite, is reduced to a negligible rate by a flush and slight flow of an inert gas such as argon.

An object of this invention is to provide a blackbody source capable of continuous operation at temperatures up to and in excess of 2200° C.

Another object of the invention is to provide a blackbody radiation device wherein stray magnetic fields are eliminated which would tend to upset the delicate instrumentation customarily used with such blackbody devices.

A further object of this invention is to provide a blackbody radiation device wherein the amount of electrical power required for its operation is reduced.

Still another object of this invention is to provide a blackbody radiation source which will reach equilibrium temperature rapidly.

Other objects of the invention will become apparent in the following detailed description.

FIG. 1 is an axial sectional view of one embodiment of this invention.

FIG. 2 is a sectional view taken along lines 2—2 of FIG. 1.

FIG. 3 is an axial sectional view of a second embodiment of this invention.

FIG. 4 is an enlarged sectional view of the radiating surface taken along lines 4—4 of FIG. 3.

The blackbody device 11 shown in FIG. 1 comprises a cylindrical housing 12 generally made of a conductive material such as brass or copper. At one end of the device is situated an electrical connector 13 to which is connected the power from a power source not shown. The connector 13 is held in place by a tight-fitted bushing 14 of a non-conductive material such as methyl methacrylate which serves to prevent the electricity being conducted through the conductor 13 from escaping through the walls of the chamber 12. Two O-ring seals 15 are situated within the bushing 14 so as to prevent the escape of the water coolant used that is normally present. The insulating bushing 14 is secured in place by means of a flange portion 17 that keys into the outer housing 12 and is overlapped by the cylindrically-shaped conductor 18. Screws 19 secure the base 18 to the main casing 12 and enable the terminal to be removed facilitating the disassembly of the lower end of the device.

Rigidly affixed to the terminal 13 is a metal bellows 21. The opposite end of the metal bellows is in turn attached to a metallic piston member 22 which slides in the opening 23 provided within the housing 12. The plurality of O-ring seals 24 serve to electrically insulate the piston from the walls of the casing 12 and additionally serve to prevent cooling fluid from contacting the element utilized. The radiating element 20 which may be of a graphite material is threadedly secured at one end thereof within the slidable piston 22 while the opposite end is threadedly connected to a metal bushing 25. The plurality of O-ring seals 26 seated in channels in the bushing 25 serve to prevent leakage of fluid used as coolant as will be later explained.

The radiation element 20 is generally an elongated tubular member and is disposed coaxially about the center axis of the device. The lower terminal end of the element which is situated within the piston 22 may be of solid material while the opposite upper terminal hollow end may have a plug 27 inserted therein serving to prevent collapse of the thin-walled structure. The element may be of any refractory electrically conductive material.

A slit 28 is provided through the wall of the tubular radiation member 20. It is through this slit that the radiation is emitted and passes through an aperture 29 provided in the casing 12. In a particular example, a graphite tube having an outside diameter of .25 inch with an .050 inch wall was provided with a .25 x .030 inch slit disposed approximately halfway between the points of first thermal or electrical contact. The instrument to be calibrated may be situated adjacent the casing 12 at the opening 29 so as to receive the desired radiation. An end cap 30 is provided to surround the end of the element 22 that protrudes beyond the bushing 25 and is secured to the casing 12 by means of screws 31. The end cap 30 serves to protect the protruding end of the element and assures electrical contact between the bushing 25 and casing 12.

An inlet aperture 32 is provided in the casing 12 for the admission of coolant liquid which preferably may be water. The coolant is directed in a linear passage 33 to a chamber 34 defined by the bushing 25 and the casing 12. Communicating with the chamber 34 is a plurality of additional linear passages 35 as seen in FIG. 2 which sereve to conduct the coolant fluid from the chamber 34 to a second chamber 36 situated within the casing surrounding the bellows 21. An outlet 37 is provided as an aperture in the casing 12 for removing of the coolant used in the chamber 36. A further plurality of apertures 38 may be provided within the base of the piston 22 for admitting the coolant to the interior of the bellows 21 so as to equalize pressure within the bellows. It is pointed out that the number of cooling passages 35 may vary considerably depending upon the size of the device and that the six passages are shown in FIG. 2 by way of example only.

Erosion and oxidation of hot graphite element 20 may be reduced to a negligible rate by flushing in a slight flow of an inert gas such as argon which enters through an aperture 39 provided in the housing 12 and surrounds the element within the cavity 40. The gas escapes through the opening 29 provided in front of the slit.

As can now readily be appreciated, the plurality of O-ring seals 15, 24 and 26 can serve to isolate the element 20 from coming in contact with the coolant utilized in the device. Additionally, it is to be pointed out that the unique design features of this invention permit linear expansion of the radiation element 20 and eliminate thermal stresses while still being able to maintain good electrical connection. This is accomplished by the radiation tube being rigidly affixed at its upper end while the lower end is attached to the bellows 21 through the piston member 22. The piston member 22 serves to center the radiation tube 20 and allows the linear motion of the tube end while preventing the cooling water from coming in contact with it. Furthermore, the bellows expansion joint 21 allows for the use of "noble" materials such as platinum for the element 20, which is convenient when the use of a gas flush is not feasible.

A further feature of the invention as disclosed is the concentric arrangement of the conductors, that is, the radiation tube 20 in the housing 12. This arrangement essentially eliminates the alternating magnetic fields which would be produced by the heavy currents in the range of hundreds of amperes used to heat the element 20. Additionally, the concentric arrangement provides for a surrounding of the heater element 20 with a material of low absorptivity so that the amount of power required for heating the element is greatly reduced.

Referring now to FIG. 3, there is shown a second configuration of the invention. The device shown in FIG. 3 retains most of the novel features shown in FIG. 1. Corresponding (or like) parts in FIGURES 3 and 1 are designated by the same numerals, which are primed in FIG. 3 but are not primed in FIG. 1. However, it provides for a circular rather than a slit aperture in the heated element. The tube 41 possesses a medially and transversely located disc-shaped partition 42 which has a radiating upper surface defined by a plurality of concentric V-shaped grooves 43 as shown in FIG. 4. It has been determined that a conical surface radiates exceedingly well. However, if one were to desire, for example, a 15° cone, the height of a single one would have to be quite large in the present device. Thus, applicants have provided a plurality of small concentric V-shaped surfaces so that each could have the desired angle yet not be very large. The radiating surface is of the same material as the tube and is preferably integral therewith. The number of concentric V-shaped surfaces will depend on the angle determined and the size of the section. There have been shown by way of example only. The radiating surface 43 is viewed axially in the device through the aperture 44 provided in the end closure 45.

In the devices disclosed the upper and lower ends of the radiation element may be copper plated especially when they are of graphite material so as to assure better electrical contact.

In addition to the V-shaped grooves disclosed in the radiation section in FIG. 3, other geometrical surface configurations may be utilized in which a plurality of radiating surfaces are disposed at angles normal to the radiation. Such configurations would include a multi-pyramid surface, a multi-conical surface for examples.

Calibrations of the device can be made with a laboratory-type optical pyrometer which in turn can be checked against a National Bureau of Standards-certified tungsten ribbon lamp. A calibration curve (a plot of blackbody temperature versus current) can then be obtained and be used thereafter to set the device to the desired temperature.

Although the invention has been described and illustrated in detail, it is to be clearly understood that the same is by way of illustration and example only and is not to be taken by way of limitations, the spirit and scope of this invention being limited only by the terms of the appended claims.

We claim:

1. A blackbody radiation device comprising:
   a housing provided with a lateral aperture for emitting radiation,
   a tubular-walled blackbody radiation element disposed coaxially within said housing about the center axis thereof, said element being closed at its ends, said element provided with an opening therein aligned with said housing aperture for emitting radiation therethrough from the interior of said element,
   means affixed to one end of said element for relieving thermal linear expansion thereof,
   and means for conducting electrical current to said element.

2. The device in claim 1 wherein said means for relieving thermal linear expansion comprises:
   a slidable piston means having one end disposed about said lower end of said element,
   and a bellows means affixed to the opposite end of said piston means whereby linear movement of said element causes contraction or expansion of said bellows means.

3. The device of claim 1 additionally having means for cooling said housing and said upper and lower ends of said element.

4. The device of claim 1 additionally having means for providing an inert gas flush to said radiation element.

5. The device of claim 1 wherein said radiation element is provided with a slit aperture in wall thereof for the emission of radiation,
   and a plug means is provided to close said upper end of said element.

6. The device of claim 1 additionally comprising:
   means for fixedly securing one end of said element within said housing, wherein said means for relieving thermal expansions is affixed to the opposite end of said element.

7. A blackbody radiation device comprising:
   a housing provided with an opening at one end thereof for emitting radiation,
   a tubular-walled blackbody radiation element disposed co-axially within said housing about the center axis thereof, said element open at one end thereof and closed at the oposite end, said open end aligned with said open end of said housing for emitting radiation from the interior of said element,
   a radiating disc-shaped partition disposed medially and transversely within said blackbody element, whereby one side of said surface is exposed for viewing through said open end of said housing,
   means affixed to one end of said element for relieving thermal linear expansion thereof, and means for conducting electrical current to said element.

8. The device of claim 7 wherein said side of said partition to be viewed is provided with a plurality of radiating surfaces normal to the radiation.

9. The device of claim 7 wherein said partition is provided a plurality of concentric V-shaped grooves.

References Cited by the Examiner

UNITED STATES PATENTS

| | | | |
|---|---|---|---|
| 1,593,725 | 7/26 | Sharpe. | |
| 1,692,479 | 11/28 | Weintz | 13—25 |
| 1,716,614 | 6/29 | Bergman | 219—74 |
| 1,729,673 | 10/29 | Kercher | 219—37.7 |
| 1,733,530 | 10/29 | Dowiatt | 13—25 |
| 1,985,280 | 12/34 | Carleton | 338—316 |
| 2,109,758 | 3/38 | Touceda | 219—36 |
| 2,253,981 | 8/41 | Peyches | 13—25 |
| 2,489,753 | 11/49 | Cox | 219—36 |
| 2,522,482 | 9/50 | Olzak | 219—74 |
| 2,667,806 | 2/54 | Gier et al. | |
| 2,827,539 | 3/58 | Smith et al. | |
| 2,952,762 | 9/60 | Williams. | |

FOREIGN PATENTS

| | | |
|---|---|---|
| 49,653 | 2/39 | France. |
| 738,848 | 10/55 | Great Britain. |

RICHARD M. WOOD, *Primary Examiner.*